3,099,691
PREPARATION OF ORGANIC PHOSPHINES FROM PHOSPHORUS, AN ALKYL HALIDE AND AN ORGANIC LITHIUM OR SODIUM COMPOUND

Michael M. Rauhut, Norwalk, and Andrew M. Semsel, Stamford, Conn., assignors to American Cyanamid Company, Stamford, Conn., a corporation of Maine
No Drawing. Filed July 24, 1962, Ser. No. 212,156
7 Claims. (Cl. 260—606.5)

The present invention relates to organophosphorus compounds and to the preparation of same. More particularly, the instant discovery concerns primary, secondary and tertiary aryl, alkyl and cycloalkyl phosphines.

Pursuant to the present invention elemental phosphorus is brought into reactive contact, in the presence of an inert organic solvent, such as tetrahydrofuran, with an organometallic compound selected from the group consisting of an aryl, alkyl and cycloalkyl lithium or sodium compound, and an alkyl halide to produce the corresponding organic phosphines.

According to a typical embodiment, white phosphorus is added to a solution of phenyllithium and butyl bromide in ether. The resulting mixture is refluxed for several hours and then dibutylphenylphosphine and butyldiphenylphosphine, for example, are recovered therefrom by distillation. As will be seen hereinafter, the addition of water to said resulting mixture after reaction of the phosphorus, organometallic and alkyl halide reactants results in the production of primary and secondary phosphines as well.

Typical mono- and di-nuclear aryl lithium and sodium compounds, alkyl ($C_1$–$C_{12}$) lithium and sodium compounds and cycloalkyl lithium and sodium compounds within the purview of the instant invention are: n-butyllithium, 1-naphthyllithium, 3-(trifluoromethyl) phenyllithium, 4-fluorophenyllithium, 4-methoxyphenyllithium, heptyllithium, cyclohexyllithium, n-dodecyllithium, heptafluoropropyllithium, 6-methoxy-2-naphthyllithium, n-propyllithium, 4-tolyllithium, 4-chlorophenyllithium, butyl sodium, pentyl sodium, phenyl sodium, benzyl sodium, and the like.

Obviously, from the above list of organometallic compounds, the organic moiety may or may not be substituted. Typical substituents for the organic moiety are those which under the conditions of the reaction contemplated herein are inert: halogen, such as fluorine, and the like, lower alkoxy, such as methoxy, ethoxy, propoxy and butoxy, and like substituents.

The elemental phosphorus reactant may be employed, as indicated hereinabove, as a finely-divided white phosphorus. However, elemental phosphorus in a different physical state, such as molten phosphorus or phosphorus in the form of "chunks," or other similar fractions, may be employed.

Typical alkyl halides within the purview of the instant discovery are those having from 1 to 12 carbon atoms in the alkyl moiety, such as the halides of: methyl-, ethyl-, propyl-, butyl-, pentyl-, hexyl-, heptyl-, octyl-, nonyl-, decyl-, undecyl-, and dodecyl-. Typical halide moieties intended herein are chlorine, bromine, and iodine.

As pointed out above, the reactants are brought together in the presence of an inert organic solvent, i.e., a solvent which under the conditions of the reaction described herein does not react to any substantial degree with the reactants. Typical inert solvents are ethers, aromatic hydrocarbons, aliphatic hydrocarbons, and the like, such as the following tetrahydrofuran, diethylether, benzene, toluene, xylene, dimethoxyethane, diethylether of diethyleneglycol, dioxane, pentane, decane, dodecane, etc.

The reactants of the present invention may be brought together in any sequence. Good results are obtained by establishing a solution of the organo-metallic reactant and the alkyl halide in an inert organic solvent and adding the elemental phosphorus thereto.

As to the ratio of the reactants, phosphorus:organometallic:alkyl halide, generally employed, at least a 1:1:1 ratio is used. However, almost any excess, within practicality, of the organometallic and/or the alkyl halide with respect to elemental phosphorus is contemplated herein. For example, basis one atom of phosphorus, ratios of the following order may be employed: 1:3:3, 1:5:1, 1:1:5, 1:1:1, 1:3:10, and the like. Preferably, however, ratios in the range of 2:3:3 and 1:5:5 are employed.

While very desirable results are achieved at ambient temperatures (20° C.–25° C.), it will be obvious to the skilled chemist that a broad range of temperatures may be employed, say, from 0 to 150° C. Good results are achieved by maintaining the reaction mixture under reflux.

By the same token, the process of the present invention may be carried out at atmospheric, sub-atmospheric or super-atmospheric pressure. Batch, continuous or semi-continuous conditions may be employed.

The products of the present invention may be defined generically by the following formula $$R_yPR'_{3-y}$$

wherein P is phosphorus; R is H, aryl, substituted aryl, alkyl ($C_1$–$C_{12}$), or cycloalkyl; R' is H or alkyl ($C_1$–$C_{12}$); and y is selected from 1 and 2.

The present invention will best be understood from the following typical examples:

EXAMPLE I

*Phenylphosphine*

*Dibutylphenylphosphine*

*Butyldiphenylphosphine*

White phosphorus (7.7 grams, 0.25 gram atom) is cut under water into approximately 0.5 gram pieces, washed with acetone and with ether and added under nitrogen to a stirred solution of 0.5 mole of phenyllithium and 68.5 grams (0.5 mole) of butylbromide in 250 milliliters of ether. The exothermic reaction is maintained at 35° C. with an ice bath during 45 minutes. The mixture is refluxed an additional six hours and then treated with 100 milliliters of water. The aqueous phase is separated and extracted with 50 milliliters of ether. The ether solutions are combined, dried with anhydrous sodium sulfate and distilled to obtain 2.7 grams of phenylphosphine, boiling point 50° C.–65° C. (20 milliliters of mercury pressure), 14.4 grams of dibutylphenylphosphine, boiling point 107° C.–129° C. (5 millimeters of mercury pressure), and 16.7 grams of butyldiphenylphosphine, boiling point 87° C.–92° C. (0.1 millimeter of mercury pressure).

The dibutylphenylphosphine is redistilled to obtain a sample, boiling point 163° C. (17 millimeters of mercury pressure), for analyses.

Analysis.—Calculated for $C_{14}H_{23}P$: C, 75.64; H, 10.43. Found: C, 75.98; H, 10.70.

The butyldiphenylphosphine is redistilled to obtain a sample, boiling point 114° C.–115° C. (0.15 millimeter of mercury pressure) for analyses.

Analysis.—Calculated for $C_{16}H_{19}P$: C, 79.31; H, 7.90; P, 12.78. Found: C, 79.27; H, 7.98; P, 12.81.

EXAMPLE II

*Butyl(1-Naphthyl)Phosphine*

*Butylbis(1-Naphthyl)Phosphine*

A mixture of 1-naphthyllithium and butyl bromide in ether is prepared by adding butyllithium, prepared from 137.0 grams (1.0 mole) of butyl bromide and 17.2 grams (2.5 gram atom) of lithium in 600 milliliters of ether, to a solution of 165.6 grams (0.8 mole) of 1-bromonaphthylene in 100 milliliters of ether. White phosphorus (12.4 grams, 0.4 gram atom) cut into 0.5 gram pieces is added, and the mixture is stirred at 20° C.–25° C. for 4 hours under nitrogen. The reaction mixture is treated with 400 milliliters of water. The organic phase is separated, dried with anhydrous magnesium sulfate and distilled to obtain 16.6 grams of naphthalene, boiling point 109° C.–130° C. (20 millimeters of mercury pressure), 48.9 grams of 1-butylnaphthalene, boiling point 90° C.–110° C. (0.1 millimeter of mercury pressure), 30.5 grams of butyl(1-naphthyl)phosphine, boiling point 123° C.–131° C. (0.1 millimeter of mercury pressure), and 25.0 grams of butylbis(1-naphthyl)phosphine, boiling point 200° C.–221° C. (0.1 millimeter of mercury pressure).

The butyl(1-naphthyl)phosphine is redistilled to give an analytical sample, boiling point 111° C.–113° C. (0.05 millimeter of mercury pressure).

Analysis.—Calculated for $C_{14}H_{17}P$: C, 77.75; H, 7.93; P, 14.32. Found: C, 77.55; H, 7.96; P, 13.63.

The butylbis(1-naphthyl)phosphine is distilled to give a sample, boiling point 224° C.–226° C. (0.2 millimeter of mercury pressure).

Analysis.—Calculated for $C_{24}H_{23}P$: C, 84.18; H, 6.77; P, 9.05. Found: C, 83.33; H, 6.83; P, 8.99.

EXAMPLE III

*Dibutyl(3-Trifluoromethylphenyl)Phosphine*

*Butylbis(3-Trifluoromethylphenyl)Phosphine*

A solution of 3-trifluoromethylphenyllithium and butyl bromide in ether is prepared by adding butyllithium, obtained from 60.8 grams (0.44 mole) of butyl bromide and 6.9 grams (1.0 gram atom) of lithium in 250 milliliters of ether, to a solution of 100.0 grams (0.44 mole) of 3-trifluoromethyl bromobenzene in 50 milliliters of ether at −20° C. White phosphorus (6.9 grams, 0.22 mole) cut into 0.5 gram pieces is added and the mixture is stirred under nitrogen for 3 hours. The reaction mixture is refluxed gently during the first thirty minutes and gradually cooled to room temperature. A dark red reaction mixture results which is treated with 200 milliliters of water. The organic phase is separated, dried with anhydrous sodium sulfate and distilled under reduced pressure to obtain 23.4 grams of dibutyl(3-trifluoromethylphenyl)phosphine, boiling point 140° C.–155° C. (18 millimeters of mercury pressure), and 31.0 grams of butylbis(3-trifluoromethylphenyl)phosphine, boiling point 165° C.–175° C. (18 millimeters of mercury pressure).

EXAMPLE IV

*Dibutyl(4-Methoxyphenyl)Phosphine*

*Butylbis(4-Methoxyphenyl)Phosphine*

A solution of 4-methoxyphenyllithium and butylbromide in ether is prepared by adding butyllithium, obtained from 137.0 grams (1.0 mole) of butyl bromide and 17.2 grams (2.5 gram atom) of lithium in 600 milliliters of ether, to a reaction of 187.1 grams (1.0 mole) of 4-bromoanisole in 100 milliliters of ether. White phosphorus (15.5 grams, 0.5 gram atom) cut into 0.5 gram pieces is added, and the mixture is refluxed 4 hours under nitrogen. The resulting dark red solution is allowed to stand at room temperature for 16 hours and then treated with 250 milliliters of water. The organic phase is separated, dried with anhydrous sodium sulfate and distilled to obtain 11.7 grams of anisole, boiling point 34° C.–45° C. (9 millimeters of mercury pressure), 29.1 grams of 4-bromoanisole, boiling point 72° C.–94° C. (9 millimeters of mercury pressure), 16.2 grams of 4-butylanisole, boiling point 104° C.–106° C. (8 millimeters of mercury pressure), 18.6 grams of dibutyl(4-methoxyphenyl)phosphine, boiling point 116° C.–118° C. (0.1 millimeter of mercury pressure), $N_D^{25}$ 1.5277, and 39.3 grams of butylbis(4-methoxyphenyl)phosphine, boiling point 163° C.–180° C. (0.1 millimeter of mercury pressure).

Dibutyl(4-methoxyphenyl)phosphine is characterized by reacting a sample with methyl iodide in refluxing ether to obtain dibutylmethyl(4-methoxyphenyl)phosphonium iodide, melting point 86° C.–88° C. (literature melting point is 87° C.).

Butylbis(4-methoxyphenyl)phosphine is redistilled to obtain an analytical sample, boiling point 175° C.–178° C. (0.3 millimeter of mercury pressure).

Analysis.—Calculated for butylbis(4-methoxyphenyl)phosphine, $C_{18}H_{23}O_2P$: C, 71.50; H, 7.17; P, 10.25. Found: C, 71.38; H, 7.61; P, 10.24.

EXAMPLE V

*Dibutylphosphine*

*Tributylphosphine*

Butyl lithium prepared from 3.0 grams (0.44 gram atom) of lithium and 27.4 grams (0.20 mole) of butyl bromide in 120 milliliters of ether is cooled to 5° C. and combined under nitrogen with 3.1 grams (0.1 gram atom) of phosphorus which is cut into approximately 0.08 gram pieces. The mixture is stirred at 5° C. for one hour and at 26° C. for two hours. The mixture, which still contains a substantial amount of unreacted phosphorus, is cooled to 0° C. and a solution of 20.6 grams (0.15 mole) of butyl bromide in 40 milliliters of ether is added with stirring during 75 minutes. The cooling bath is removed, and the temperature sponstaneously rises to reflux during ten minutes. After the exotherm the mixture is allowed to stand overnight and treated with 100 milliliters of water. The organic phase is separated, dried over anhydrous sodium sulfate, and distilled to obtain 1.4 grams (9.6 percent) of dibutylphospine, boiling point 72° C.–75° C. (17 millimeters of mercury pressure) and 7.8 grams (39 percent) of tributylphosphine, boiling point 120° C.–122° C. (17 millimeters of mercury pressure).

EXAMPLES VI–XXIII

The following table further illustrates the present invention, the examples contained therein being carried out essentially as in the examples (above), except as indicated:

TABLE I

| Example No. | Organometallic | Alkyl Halide | Mole Ratio—Org. Metallic: Alkyl Halide: P atom | Inert Organic Solvent | (° C.) Temp. | Process According to Example | Products |
|---|---|---|---|---|---|---|---|
| VI | phenyllithium | butyl chloride | 2:2:1 | $Et_2O$ | 25 | I | dibutylphenylphosphine, butyldiphenylphosphine. |
| VII | n-butylsodium | do | 1:1:1 | n-octane | 37 | I | dibutylphosphine, tributylphosphine. |
| VIII | phenylsodium | do | 1:1.2:1 | $C_6H_5CH_3$ | 48 | I | dibutylphenylphosphine, butyldiphenylphosphine. |
| IX | 4-fluorophenyllithium | butyl bromide | 1:1:1 | $Et_2O$ | reflux | II | butyl-4-fluorophenylphosphine butyl-bis(4-fluoromethyl) phosphine, dibutyl-4-fluorophenylphosphine. |
| X | cyclohexyllithium | hexyl chloride | 2:1:1 | $Et_2O$ | 30 | V | cyclohexyldihexylphosphine, dicyclohexylhexylphosphine. |
| XI | n-dodecyllithium | dodecyl bromide | 1.5:1.5:1 | $Et_2O$—$C_6H_5CH_3$ | 25 | V | tridodecylphosphine. |
| XII | n-propyllithium | pentyl chloride | 1.5:1:1 | $Et_2O$ | 15 | V | dipentylpropylphosphine, dipropylpentylphosphine. |
| XIII | pentylsodium | n-pentyl chloride | 1:1:1 | pentane | 38 | I | tripentylphosphine. |
| XIV | 1-naphthyllithium | butyl bromide | 2:2:1 | $Et_2O$ | 22 | II | bis (1-naphthyl)-butylphosphine, butyl (1-naphthyl)-phosphine. |
| XV | 6-methoxy-2-naphthyllithium | methyl bromide | 4:1:1 | $Et_2O$—$C_6H_6$ | 10 | II | dimethyl-6-methoxy-2-naphthylphosphine (6-methoxy-2-naphthyl) methylphosphine. |
| XVI | 4-methoxyphenyllithium | butyl bromide | 1.5:1.5:1 | $Et_2O$ | 35 | II | bis-butyl-4-methoxyphenylphosphine, bis (4-methoxyphenyl)-butylphosphine. |
| XVII | 3-(trifluoromethyl)phenyllithium | do | 1.5:1.5:1 | $Et_2O$ | 35 | II | butyl-bis[3(trifluoromethyl)-phenyl]phosphine. |
| XVIII | phenyllithium | do | 1.5:1.5:1 | $Et_2O$—$C_6H_6$ | 0 | II | butylphenylphosphine, dibutylphenylphosphine, butyldiphenylphosphine. |
| XIX | benzylsodium | butyl chloride | 1:1:1 | decane | 38 | I | tribenzylphosphine. |
| XX | phenylsodium | ethyl bromide | 1:1:1 | octane | 35 | I | phenyldiethylphosphine, diphenylethylphosphine. |
| XXI | do | dodecylbromide | 1:1:1 | decane | 40 | I | diphenyldodecylphosphine, phenyldidodecylphosphine. |
| XXII | cyclohexylsodium | butyl chloride | 1:1:1 | pentane | 30 | I | cyclohexylbutylphosphine. |
| XXIII | 1-naphthylsodium | do | 1:1:1 | do | 20 | I | bis(1-naphthyl)-butylphosphine. |

EXAMPLE XXIV

One-half mole of phenyllithium in 300 milliliters of ether is added dropwise during one hour to a stirred mixture of 10.3 grams (0.33 gram atom) of white phosphorus, 137 grams (1 mole) of butyl bromide and 100 milliliters of ether. The mixture refluxes spontaneously and is refluxed for one additional hour. Seventy-five milliliters of water is added and the organic phase separated. The organic phase is dried with anhydrous soduim sulfate and distilled under nitrogen to obtain butyl phosphine, boiling point 71° C.–75°C.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

It can be seen that the process of the present invention provides a novel, straightforward and ready route to numerous organic phosphines. These phosphines have a number of uses. For example, they have direct utility as gasoline additives, since up to about 10 milliliters of any one of these phosphines, when dissolved in one gallon of gasoline, affords protection against misfiring, surface ignition, and the like.

This application is a continuation-in-part of our co-pending application Serial No. 67,884, filed November 8, 1960, now abandoned.

We claim:

1. A method of preparing organic phosphines which comprises (a) bringing into reactive contact, in the presence of an inert organic solvent, elemental phosphorus, an alkyl halide and an organometallic compound selected from the group consisting of mono-nuclear aryl lithium, mono-nuclear aryl sodium, di-nuclear aryl lithium, di-nuclear aryl sodium, substituted mono-nuclear aryl lithium, substituted mono-nuclear aryl sodium, substituted di-nuclear aryl lithium, substituted di-nuclear aryl sodium, alkyl lithium, alkyl sodium, cycloalkyl lithium and cycloalkyl sodium, said substituents for the mono- and di-nuclear aryl lithium and sodium members, above, being selected from the group consisting of halogen and lower alkoxy, and said alkyl moieties of the members given above having from 1 to 12 carbon atoms and (b) recovering the resulting corresponding tertiary organic phosphine.

2. The process of claim 1 wherein the reaction mixture resulting from the reaction of phosphorus, alkyl halide and the organometallic compound is hydrolyzed and the resulting primary and secondary organic phosphines are recovered from the hydrolyzed mixture in addition to the tertiary phosphines.

3. The process of claim 1 wherein the organometallic compound is n-butyllithium.

4. The process of claim 1 wherein the organometallic compound is 1-naphthyllithium.

5. The process of claim 1 wherein the organometallic compound is phenyllithium.

6. The process of claim 1 wherein the organometallic compound is 3-(trifluoromethyl)phenyllithium.

7. The process of claim 1 wherein the organometallic compound is cyclohexyllithium.

No references cited.